(12) United States Patent
Fix et al.

(10) Patent No.: US 9,521,647 B2
(45) Date of Patent: *Dec. 13, 2016

(54) SITE LOCATION DETERMINATION USING CROWD SOURCED PROPAGATION DELAY AND LOCATION DATA

(71) Applicant: AT&T Mobility II LLC, Atlanta, GA (US)

(72) Inventors: Jeremy Fix, Acworth, GA (US); Larry Fix, Spartanburg, SC (US); Sheldon Kent Meredith, Marietta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,622

(22) Filed: Mar. 18, 2016

(65) Prior Publication Data

US 2016/0202345 A1 Jul. 14, 2016

Related U.S. Application Data

(63) Continuation of application No. 13/495,756, filed on Jun. 13, 2012, now Pat. No. 9,326,263.

(51) Int. Cl.
*H04W 24/00* (2009.01)
*H04W 64/00* (2009.01)
(Continued)

(52) U.S. Cl.
CPC .............. *H04W 64/00* (2013.01); *G01S 5/021* (2013.01); *G01S 5/0221* (2013.01); *G01S 5/14* (2013.01); *H04W 4/02* (2013.01)

(58) Field of Classification Search
CPC ..................................................... H04W 64/00
(Continued)

(56) References Cited

U.S. PATENT DOCUMENTS

| 4,718,081 A | 1/1988 | Brenig |
| 5,515,062 A | 5/1996 | Maine et al. |

(Continued)

FOREIGN PATENT DOCUMENTS

| EP | 0856746 A2 | 8/1998 |
| EP | 1145526 | 10/2001 |

(Continued)

OTHER PUBLICATIONS

Office Action dated Apr. 8, 2014 for U.S. Appl. No. 13/175,199, 52 Pages.

(Continued)

*Primary Examiner* — Muthuswamy Manoharan
(74) *Attorney, Agent, or Firm* — Amin, Turocy & Watson, LLP

(57) ABSTRACT

Site location determination using crowd sourced propagation delay and location data is provided. A propagation delay component receives a set of propagation delay measurements for communications between a mobile device and an access point. A user equipment location component receives a location of the mobile device, and a combination component combines the set of propagation delay measurements and the location into a set of location data. An access point location component determines a set of intersecting locations between the set of location data and additional sets of location data, and determines a location of the access point based on the set of intersecting locations.

20 Claims, 11 Drawing Sheets

(51) Int. Cl.
  *H04W 4/02* (2009.01)
  *G01S 5/02* (2010.01)
  *G01S 5/14* (2006.01)

(58) Field of Classification Search
  USPC .............................. 455/456.3, 456.2, 456.1
  See application file for complete search history.

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,058,260 A | 5/2000 | Brockel et al. |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,203,752 B2 | 4/2007 | Rice et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,897,805 B2 | 11/2014 | Fix et al. |
| 8,909,247 B2 | 12/2014 | Tipton et al. |
| 9,008,684 B2 | 4/2015 | Tipton et al. |
| 9,008,698 B2 | 4/2015 | Meredith et al. |
| 9,232,399 B2 | 1/2016 | Tipton et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1* | 2/2003 | Pihl ..................... H04W 64/00 455/456.1 |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1* | 7/2003 | Riley ................... G01S 5/0205 455/456.1 |

(56) References Cited

U.S. PATENT DOCUMENTS

| | | |
|---|---|---|
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0200303 A1 | 9/2006 | Fuentes et al. |
| 2006/0240839 A1 | 10/2006 | Chen et al. |
| 2006/0240841 A1* | 10/2006 | Bhattacharya .......... G01S 5/021 455/456.1 |
| 2006/0267841 A1 | 11/2006 | Lee et al. |
| 2006/0270419 A1 | 11/2006 | Crowly et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0079622 A1 | 3/2009 | Seshadri et al. |
| 2009/0104917 A1 | 4/2009 | Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1* | 12/2010 | Gerstenberger ...... G01S 5/0226 455/456.5 |
| 2010/0331013 A1* | 12/2010 | Zhang ................... G01S 5/0242 455/456.2 |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |

(56) References Cited

U.S. PATENT DOCUMENTS

| | | | |
|---|---|---|---|
| 2012/0052883 A1 | 3/2012 | Austin et al. | |
| 2012/0052884 A1 | 3/2012 | Bogatin | |
| 2012/0062415 A1 | 3/2012 | Hwang et al. | |
| 2012/0087338 A1 | 4/2012 | Brandt et al. | |
| 2012/0139782 A1 | 6/2012 | Gutt et al. | |
| 2012/0144452 A1 | 6/2012 | Dyor et al. | |
| 2012/0144457 A1 | 6/2012 | Counterman | |
| 2012/0158289 A1 | 6/2012 | Brush et al. | |
| 2012/0182180 A1 | 7/2012 | Wolf et al. | |
| 2012/0182874 A1 | 7/2012 | Siomina et al. | |
| 2012/0185309 A1 | 7/2012 | Kakarla et al. | |
| 2012/0214509 A1 | 8/2012 | Levin et al. | |
| 2012/0287911 A1 | 11/2012 | Takano et al. | |
| 2012/0302254 A1* | 11/2012 | Charbit | H04W 4/005 455/456.1 |
| 2012/0317500 A1 | 12/2012 | Kosseifi et al. | |
| 2012/0323703 A1 | 12/2012 | Hillier et al. | |
| 2012/0327869 A1 | 12/2012 | Wang et al. | |
| 2013/0007058 A1 | 1/2013 | Meredith et al. | |
| 2013/0023237 A1 | 1/2013 | Meredith et al. | |
| 2013/0023247 A1 | 1/2013 | Bolon et al. | |
| 2013/0023274 A1 | 1/2013 | Meredith et al. | |
| 2013/0023281 A1 | 1/2013 | Meredith et al. | |
| 2013/0053057 A1 | 2/2013 | Cansino et al. | |
| 2013/0066748 A1 | 3/2013 | Long | |
| 2013/0095861 A1 | 4/2013 | Li et al. | |
| 2013/0096966 A1 | 4/2013 | Barnes | |
| 2013/0109407 A1 | 5/2013 | Tipton et al. | |
| 2013/0114464 A1 | 5/2013 | Tarraf et al. | |
| 2013/0137464 A1 | 5/2013 | Kramer et al. | |
| 2013/0226451 A1 | 8/2013 | O'Neill et al. | |
| 2013/0281111 A1 | 10/2013 | Syrjarinne et al. | |
| 2013/0324149 A1 | 12/2013 | Fix et al. | |
| 2013/0337824 A1 | 12/2013 | Meredith et al. | |
| 2014/0062782 A1 | 3/2014 | Abraham | |
| 2014/0106779 A1* | 4/2014 | Arslan | G01S 5/0252 455/456.1 |
| 2014/0122220 A1 | 5/2014 | Bradley et al. | |
| 2014/0171060 A1 | 6/2014 | Cook et al. | |
| 2014/0278744 A1 | 9/2014 | Lo Faro et al. | |

FOREIGN PATENT DOCUMENTS

| | | | |
|---|---|---|---|
| JP | 2004069609 A | 3/2004 | |
| JP | 2005091303 A | 4/2005 | |
| JP | 2007328050 A | 12/2007 | |
| WO | WO2006031035 A1 | 3/2006 | |

OTHER PUBLICATIONS

Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62 pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21st century dictionary. Retrieved on May 9, 2014 from http://search.credoreference.com/content/entry/chambdict/represent/O.
Represent. (2011). In the American heritage dictionary of the English language. Retrieved on May 9, 2014 from http://search.credoreference.com/content/entry/hmdictenglang/represent/0.

Office Action dated May 20, 2014 for U.S. Appl. No. 13/551,369, 29 pages.
Office Action dated May 30, 2014 for U.S. Appl. No. 13/277,595, 49 pages.
Office Action dated Jun. 3, 2014 for U.S. Appl. No. 13/523,770, 53 pages.
Office Action dated Jun. 6, 2014 for U.S. Appl. No. 13/447,072, 25 pages.
Office Action dated Apr. 3, 2014 for U.S. Appl. No. 13/188,295, 37 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action mailed Mar. 11, 2016 for U.S. Appl. No. 14/743,076, 86 pages.
Notice of Allowance mailed Mar. 16, 2016 for U.S. Appl. No. 14/520,287, 23 pages.
Office Action mailed Mar. 18, 2016 for U.S. Appl. No. 13/447,072, 37 pages.
Office Action dated Apr. 5, 2016 for U.S. Appl. No. 13/188,136, 33 pages.
Office Action dated Apr. 13, 2016 for U.S. Appl. No. 14/877,915, 76 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages.
Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages.

(56) References Cited

OTHER PUBLICATIONS

Drucker, et al. Support Vector Regression Machines.http://scholar.google.com/scholar?q=%22Support+Vector+Regression+Machines.%22. Last accessed Dec. 24, 2010, 7 pages.
Suykens, et al., "Least squares support vector machine classifiers", Neural Processing Letters, vol. 9, No. 3, Jun. 1999, pp. 293-300.
Ferris, et al. (2002). "Interior-point methods for massive support vector machines". SIAM Journal on Optimization 13: 783-804. doi:10.1137/S1052623400374379.
Meyer, et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011, 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att. . . , 4 pages.
Fleischfresser. Never Stop at a Red-Light Again. Published online Aug. 30, 2011. http://www.smartplanet.com/blog/. . . , 2 pages.
Cellphone Networks and the Future of Traffic. Published online Mar. 2, 2011. http://m.wired.com/autopia/2011/03/cell-phone-networks-and-the-future-. . . 15 pages.
Intelligent Transportation System. Published online http://en.wikipedia.org/wiki/Intelligent_transportation_system, retrieved on Aug. 15, 2011, 7 pages.
Koukoumidis Emmanouil, Peh Li-Shiuan, Martonosi Margaret, SignalGuru: Leveraging Mobile Phones for Collaborative Traffic Signal Schedule Advisory, MobiSys'11, Jun. 28-Jul. 1, 2011, Bethesda, Maryland, USA. 14 pages.
Bitcarrier Technology. Published online at http://www.bitcarrier.com/technology, retrieved on Aug. 15, 2011, 1 page.
Hao Peng, Ban Xuegang(Jeff). Estimating Vehicle Position in a Queue at Signalized Intersections Using Simple Travel Times from Mobile Sensors, retrieved Nov. 18, 2011. 6 pages.
Ban Xuegang(Jeff), Gruteser Marco. Mobile Sensor as Traffic Probes: Addressing Transportation Modeling and Privacy Protection in an Integrated Framework, dated Jan. 10, 2010, 17 pages.
Office Action for U.S. Appl. No. 12/836,471 dated Dec. 28, 2011, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Office Action dated Jan. 25, 2013, for U.S. Appl. No. 13/554,285, 20 pgs.
Office Action dated Mar. 19, 2013, for U.S. Appl. No. 13/174,541, 46 pgs.
Office Action dated Feb. 13, 2013, for U.S. Appl. No. 13/220,083, 48 pgs.
Office Action dated Feb. 22, 2013, for U.S. Appl. No. 13/188,345, 45 pgs.
Office Action dated Mar. 15, 2013, for U.S. Appl. No. 13/204,535, 18 pgs.
Office Action dated Mar. 19, 2013, for U.S. Appl. No. 13/284,497, 46 pgs.
Office Action dated Apr. 19, 2013, for U.S. Appl. No. 13/277,595, 58 pages.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Oct. 22, 2014 for U.S. Appl. No. 13/557,425, 59 pages.
Office Action dated Aug. 11, 2014 for U.S. Appl. No. 14/279,176, 22 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Notice of Allowance mailed Jan. 21, 2015 for U.S. Appl. No. 13/495,391, 98 pages.
Notice of Allowance mailed Feb. 6, 2015 for U.S. Appl. No. 13/204,535, 20 pages.
Office Action dated Feb. 13, 2015 for U.S. Appl. No. 14/516,286, 62 pages.
Girardin, et al., "Digital footprinting: Uncovering tourists with user generated content." Pervasive Computing, IEEE 7.4, Oct.-Nov. 2008. 8 pages.
Steinfield, "The development of location based services in mobile commerce." ELife after the Dot Com Bust. PhysicaVerlagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.

(56) References Cited

OTHER PUBLICATIONS

Ratti, et al. "Mobile Landscapes: using location data from cell phones for urban analysis." Environment and Planning B: Planning and Design, vol. 33, 2006, 23 pages.
Office Action dated Sep. 14, 2015 for U.S. Appl. No. 13/557,425, 32 pages.
Office Action dated Apr. 16, 2015 for U.S. Appl. No. 14/521,431, 82 Pages.
Notice of Allowance dated Mar. 19, 2015 for U.S. Appl. No. 13/494,959, 41 Pages.
Notice of Allowance dated Mar. 26, 2015 for U.S. Appl. No. 14/276,688, 75 pages.
Office Action dated May 1, 2015 for U.S. Appl. No. 13/557,425, 33 pages.
Office Action dated May 14, 2015 for U.S. Appl. No. 14/530,605, 72 pages.
Office Action dated Jun. 1, 2015 for U.S. Appl. No. 13/447,072, 38 pages.
Office Action dated Jun. 2, 2015 for U.S. Appl. No. 14/516,286, 20 pages.
Office Action dated May 20, 2015 for U.S. Appl. No. 13/526,988, 52 pages.
Office Action dated Jun. 9, 2015 for U.S. Appl. No. 13/495,756, 35 pages.
Notice of Allowance dated Jul. 8, 2015 for U.S. Appl. No. 14/548,901, 125 pages.
Buford, et al, "Location Privacy Enforcement in a Location-Based Services Platform," IEEE, 2009, 5 pages.
Phillips, Jr., et al., "Information Sharing and Security in Dynamic Coalitions," ACM, 2002, pp. 87-96, 10 pages.
Moniruzzaman, et al., "A Study of Privacy Policy Enforcement in Access Control Models", Proceedings of 13th International Conference on Computer and Information Technology IEEE, 2010, pp. 352-357, 6 pages.
Office Action dated Jul. 22, 2015 for U.S. Appl. No. 13/188,136, 31 Pages.
"CELL_DCH", in INACON Glossary, published online at [http://www.inacon.de/glossary/CELL_DCH.php] retrieved on Jul. 22, 2015, 1 page.
Office Action dated Sep. 17, 2015 for U.S. Appl. No. 13/495,756, 23 Pages.
Office Action dated Sep. 18, 2015 for U.S. Appl. No. 14/641,247, 69 Pages.
Notice of Allowance dated Aug. 27, 2015 for U.S. Appl. No. 14/521,431, 39 Pages.
Office Action dated Nov. 16, 2015 for U.S. Appl. No. 13/188,136, 31 pages.
"Error", The American Heritage(R) Dictionary of the English Language, 2011, Houghton Mifflin Company, Boston, MA, 2 pages. Retrieved from [http://search.credoreference.com/contentientry/hmdictenglang/error/O] on Nov. 16, 2015.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action dated Dec. 18, 2015 for U.S. Appl. No. 14/548,901, 35 pages.
Office Action dated Dec. 31, 2015 for U.S. Appl. No. 14/952,609, 32 pages.
Office Action dated Dec. 1, 2015 for U.S. Appl. No. 13/526,988, 43 pages.
Office Action dated Nov. 30, 2015 for U.S. Appl. No. 13/447,072, 45 pages.
Office Action dated Jan. 11, 2016 for U.S. Appl. No. 13/175,199, 29 pages.
Notice of Allowance mailed Aug. 12, 2013, for U.S. Appl. No. 13/174,541, 40 pages.
Office Action dated Aug. 2, 2013, for U.S. Appl. No. 13/188,295, 26 pages.
Office Action dated Aug. 2, 2013, for U.S. Appl. No. 13/188,300, 38 pages.
Office Action dated Jun. 20, 2013, for U.S. Appl. No. 13/219,911, 61 pages.
Office Action dated Jul. 17, 2013, for U.S. Appl. No. 13/188,345, 27 pages.
Office Action dated Jun. 20, 2013, for U.S. Appl. No. 13/291,917, 52 pages.
Office Action dated May 31, 2013, for U.S. Appl. No. 13/523,770, 40 pages.
Office Action dated Sep. 19, 2013, for U.S. Appl. No. 13/927,020, 30 pages.
Office Action dated Oct. 2, 2013 for U.S. Appl. No. 12/958,146, 31 pages.
Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis.pdf.
MySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Office Action dated Nov. 5, 2013 for U.S. Appl. No. 13/188,136, 47 pages.
Office Action dated Sep. 18, 2013, for U.S. Appl. No. 13/284,497, 30 pages.
Office Action dated Aug. 22, 2013, for U.S. Appl. No. 13/277,595, 36 pages.
Office Action dated Oct. 21, 2013, for U.S. Appl. No. 13/523,770, 24 pages.
Office Action dated Nov. 5, 2013 for U.S. Appl. No. 13/188,345, 30 pages.
Office Action dated Dec. 11, 2013, for U.S. Appl. No. 13/188,295, 52 pages.
Office Action dated Dec. 24, 2013, for U.S. Appl. No. 13/188,300, 44 pages.
Office Action dated Dec. 11, 2013, for U.S. Appl. No. 13/291,917, 34 pages.
Office Action dated Jan. 15, 2014 for U.S. Appl. No. 13/219,911, 38 pages.
Office Action dated Jan. 28, 2014, for U.S. Appl. No. 12/958,146, 24 pages.
Notice of Allowance dated Feb. 14, 2014 for U.S. Appl. No. 13/284,456, 30 pages.
Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.

(56) References Cited

OTHER PUBLICATIONS

Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00(c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements, Sep. 2005.
3GPP TS 25.331 V6.9.0 (Mar. 2006) RRC protocol for the UE-UTRAN radio interface, Mar. 2006.
3GPP TS 25.413 V6.9.0 (Mar. 2006) UTRAN Iu interface RANAP signalling, Mar. 2006.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, Timo Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Office Action dated Aug. 25, 2016 for U.S. Appl. No. 13/447,072, 38 pages.
Office Action dated Jun. 22, 2016 for U.S. Appl. No. 14/970,533, 84 pages.
Office Action dated Jun. 28, 2016 for U.S. Appl. No. 15/132,220, 17 pages.
Notice of Allowance dated Jul. 19, 2016 for U.S. Appl. No. 14/952,609, 99 pages.
Office Action dated Aug. 24, 2016 for U.S. Appl. No. 14/676,066, 107 pages.
Office Action dated Jun. 10, 2016 for U.S. Appl. No. 14/548,901, 33 pages.
Office Action dated Sep. 30, 2016 for U.S. Appl. No. 14/957,525, 72 pages.
Notice of Allowance mailed Oct. 7, 2016 for U.S. Appl. No. 14/548,901, 45 pages.
Office Action dated Oct. 12, 2016 for U.S. Appl. No. 14/877,915, 34 pages.

\* cited by examiner

SITE LOCATION DETERMINATION USING CROWD SOURCED PROPAGATION DELAY AND LOCATION DATA

CROSS-REFERENCE TO RELATED APPLICATIONS

This application is a continuation of, and claims priority to, U.S. patent application Ser. No. 13/495,756, entitled "SITE LOCATION DETERMINATION USING CROWD SOURCED PROPAGATION DELAY AND LOCATION DATA," and filed Jun. 13, 2012. The entirety of the foregoing application is hereby incorporated by reference herein.

TECHNICAL FIELD

The subject disclosure relates to communication systems and, more particularly, to determining site locations using crowd sourced propagation delay and location data.

BACKGROUND

Advances in cellular phone and related network technology (e.g., microprocessor speed, memory capacity, data transfer bandwidth, software functionality, and the like) have generally contributed to increased cellular application in various settings. For example, today's cellular phones can perform many functions previously reserved for personal computers or other devices, such as web browsing, picture/video shooting, picture/video sharing, instant messaging, file sharing, and the like. As cellular phone capabilities increase, which can also increase demand for the capabilities, networks and protocols are developed to effectively support the capabilities. For example, while global system for mobile communications (GSM) was sufficient to handle functionality of cellular phones a few years ago, other technologies, such as universal mobile telecommunications system (UMTS), which is based from the third generation (3G) standard, have been developed to accommodate larger transfer rates between device and network.

More recently, fourth generation (4G) technologies have been developed, such as third generation partnership project (3GPP) long term evolution (LTE), worldwide interoperability for microwave access (WiMAX), and the like. These technologies provide even further increases in data throughput between mobile device and network, which allows for a vast array of supported device functionalities. In order to support the rapid growth and development of cellular phones and related network technologies, service providers maintain extensive infrastructures. For instance, the network infrastructure of large service providers can include tens of thousands cell site locations.

Service providers may desire to employ a cell site location to facilitate network services, such as, locating a mobile device within a wireless network. Typically, the cell site location can be determined and/or recorded by a person associated with the service provider. For instance, a network engineer may record the location of the cell site in a database during installation. If the person inaccurately records or determines the location of a cell site, then the service provider may be unable to rely on the recorded location of the cell site to facilitate the network services.

The above-described deficiencies are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

DETAILED DESCRIPTION

Figure 1:
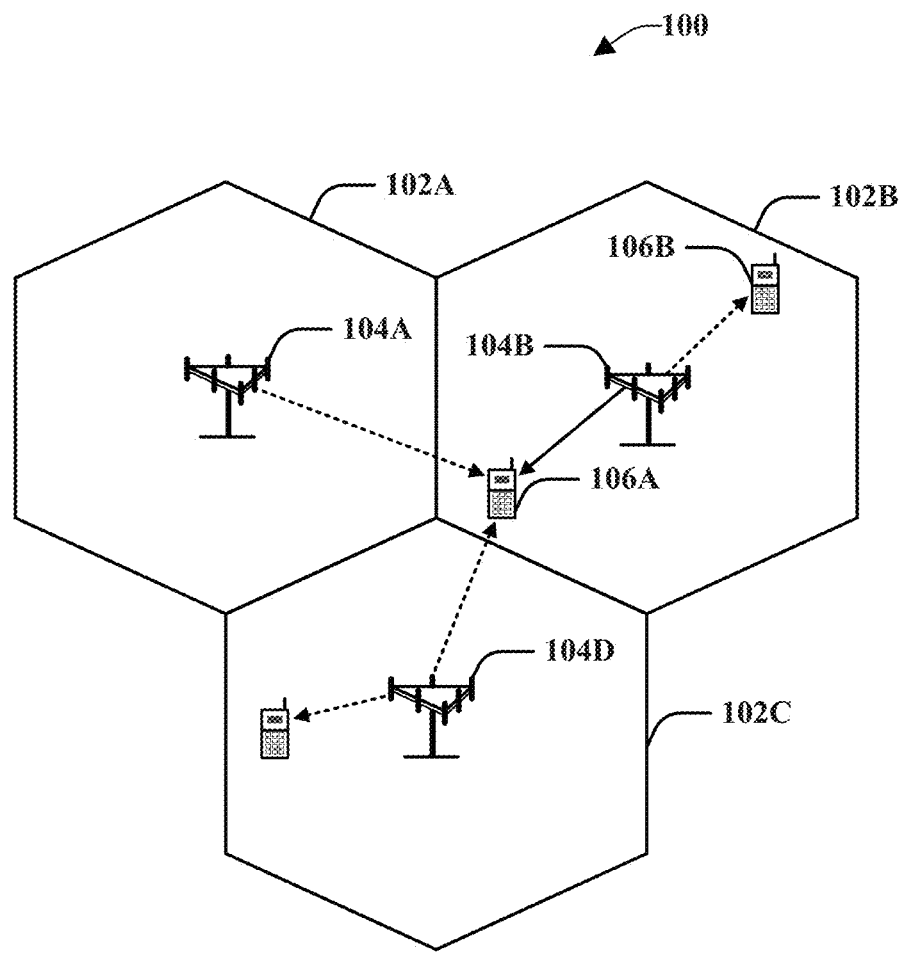
FIG. 1 illustrates an example communications network in accordance with various aspects described in this disclosure.

The subject disclosure is now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments may be practiced without these specific details. In other instances, well-known structures and devices are shown in block diagram form in order to facilitate describing the various embodiments.

As used in this application, the terms "component," "system," "platform," "service," "framework," "interface," "node," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" can be intended to mean an inclusive "or" rather than an exclusive "or." That is, unless specified otherwise, or clear from context, "X employs A or B" can be intended to mean any of the natural inclusive permutations. That is, if X employs A; X employs B; or X employs both A and B, then "X employs A or B" can be satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "mobile device," "wireless device," "access terminal," "terminal," "mobile handset," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming data, or substantially any data-stream or signaling-stream from a set of subscriber stations. Data (e.g., content or directives) and signaling streams can be packetized or frame-based flows.

Furthermore, the terms "user," "subscriber," "customer," "consumer," "agent," and the like are employed interchangeably throughout the subject specification, unless context warrants particular distinctions among the terms. It should be appreciated that such terms can refer to human entities or automated components supported through artificial intelligence (e.g., a capacity to make inferences based on complex mathematical formalisms) which can provide simulated vision, sound recognition, and so forth.

The following presents a simplified summary of the disclosure in order to provide a basic understanding of some aspects of the various embodiments. This summary is not an extensive overview of the various embodiments. It is intended to neither identify key or critical elements of the various embodiments nor delineate the scope of the various embodiments. Its sole purpose is to present some concepts of the various embodiments in a simplified form as a prelude to the more detailed description that is presented later. It will also be appreciated that the detailed description may include additional or alternative embodiments beyond those described in this summary.

Systems and methods are provided for site location determination using crowd sourced propagation delay and location data. A propagation delay component receives a set of propagation delay measurements based on communication signals exchanged by a mobile device and an access point. A user equipment location component receives a location of the mobile device, and a combination component combines the set of propagation delay measurements and the location into a set of location data. An access point location component determines a set of intersecting locations between the set of location data and additional sets of location data, and determines a location of the access point based on the set of intersecting locations.

In accordance with one aspect, a system is provided that includes at least one memory storing computer-executable instructions, and at least one processor, communicatively coupled to the at least one memory, which facilitates execution of the computer-executable instructions to at least receive propagation delay measurements based on communication signals exchanged by a mobile device and an access point, receive a location of the mobile device, and determine an estimated location of the access point based on the propagation delay measurements and the location of the mobile device.

In accordance with another aspect, a method is provided that includes receiving, by a system including a processor, propagation delay measurements based on communication signals exchanged by a mobile device and an access point, receiving, by the system, a location of the mobile device, generating, by the system, a first set of location data based at least in part on the propagation delay measurements and the location of the mobile device, comparing, by the system, the first set of location data and additional sets of location data corresponding, respectively, to a set of disparate mobile devices.

In accordance with yet another aspect, a computer readable storage medium is provided that includes computer executable instructions that, in response to execution, cause a computing system including at least one processor to perform operations, including receiving a location of a first mobile device and a first set of propagation delay measurements for communication signals exchanged by the first mobile device and an access point, generating a first set of location data using the first set of propagation delay measurements and the location of the first mobile device, receiving a location of a second mobile device and a second set of propagation delay measurements for communication signals exchanged by the second mobile device and the access point, generating a second set of location data using the second set of propagation delay measurements and the location of the second mobile device, determining a set of intersecting locations between the first set of location data and the second set of location data, and identifying an estimated location of the access point based at least in part on the set of intersecting locations.

To the accomplishment of the foregoing and related ends, the various embodiments, then, comprise one or more of the features hereinafter fully described. The following description and the annexed drawings set forth in detail certain illustrative aspects of the various embodiments. However, these aspects are indicative of but a few of the various ways in which the principles of the various embodiments may be employed. Other aspects, advantages and novel features of the various embodiments will become apparent from the following detailed description of the various embodiments when considered in conjunction with the drawings.

FIG. 1 illustrates an example wireless communication system 100 in accordance with various aspects described in this disclosure. The wireless communication system 100 (e.g., network) can support a plurality of subscribers (e.g., mobile devices, etc.). By way of example, the system 100 provides communication for multiple cells 102A-102C, with each cell being serviced by a corresponding access point (AP) 104 (such as APs 104A-104C). Each cell may be further divided into one or more sectors (e.g. to serve one or more frequencies). Various access terminals (ATs) 106, including ATs 106A-106C, also known interchangeably as user equipment (UE) or mobile devices, are dispersed throughout the system.

It can to be appreciated that the wireless communication system 100 can provide service over a geographic region. For example, the cells 102A-102C may cover a few blocks, square acres, or square miles. In addition, it can be appreciated that a virtually infinite number of cells 102 can be employed to cover a large geographic region, such as a state, country, continent, etc. In this way, a single service provider can enable virtually uninterrupted wireless communication service across a large geographic region. The service provider may desire to determine and/or employ a location of an AP (e.g., a cell site location) for a set of network services. The set of network services can include but are not limited to network locating, network optimizing, and/or network modeling. For example, the location of a UE 106B can be determined by identifying one or more APs (e.g., AP 104B) serving (or near) the UE 106B. However, if the location of the AP 104B is not accurately known to the service provider, then the location of the UE 106B cannot be accurately determined based on the location of the AP 104B. The location of the AP 104B may not be accurately known to the service provider, for example, if the location of the AP 104B is determined and/or recorded incorrectly at a time of installation, or if the AP 104B has been relocated.

In one implementation, the system 100 determines a location of an AP (e.g., AP 104B) based on a set of location data for a UE (e.g., UE 106B). The set of location data for the UE (location data) can include but is not limited to a location of a UE (UE location), and a set of propagation delay measurements for communications between the UE and the AP (propagation delay measurements). For example, a UE location can be determined using a global positioning system (GPS) and/or an assisted GPS (AGPS), and the system 100 can obtain or determine propagation delay measurements for communications from the UE 106B to the AP 104B. Based in part on the UE location and the propagation delay measurements, the system 100 can calculate, identify, or otherwise determine an estimated location for the AP 104B (discussed in greater detail with reference to FIG. 5). In addition, the system 100 can analyze or compare additional sets of location data for different UEs (e.g., UE 106A) against the location data for the UE 106B to enhance the accuracy of the determined estimated location for the AP 104B (discussed in greater detail with reference to FIG. 6). For example, the system 100 can crowd source, using a plurality of UEs, a set of sets of location data, and based on intersecting locations or overlaps of locations in the respective sets of location data determine a location of the AP 104B.

Figure 2:
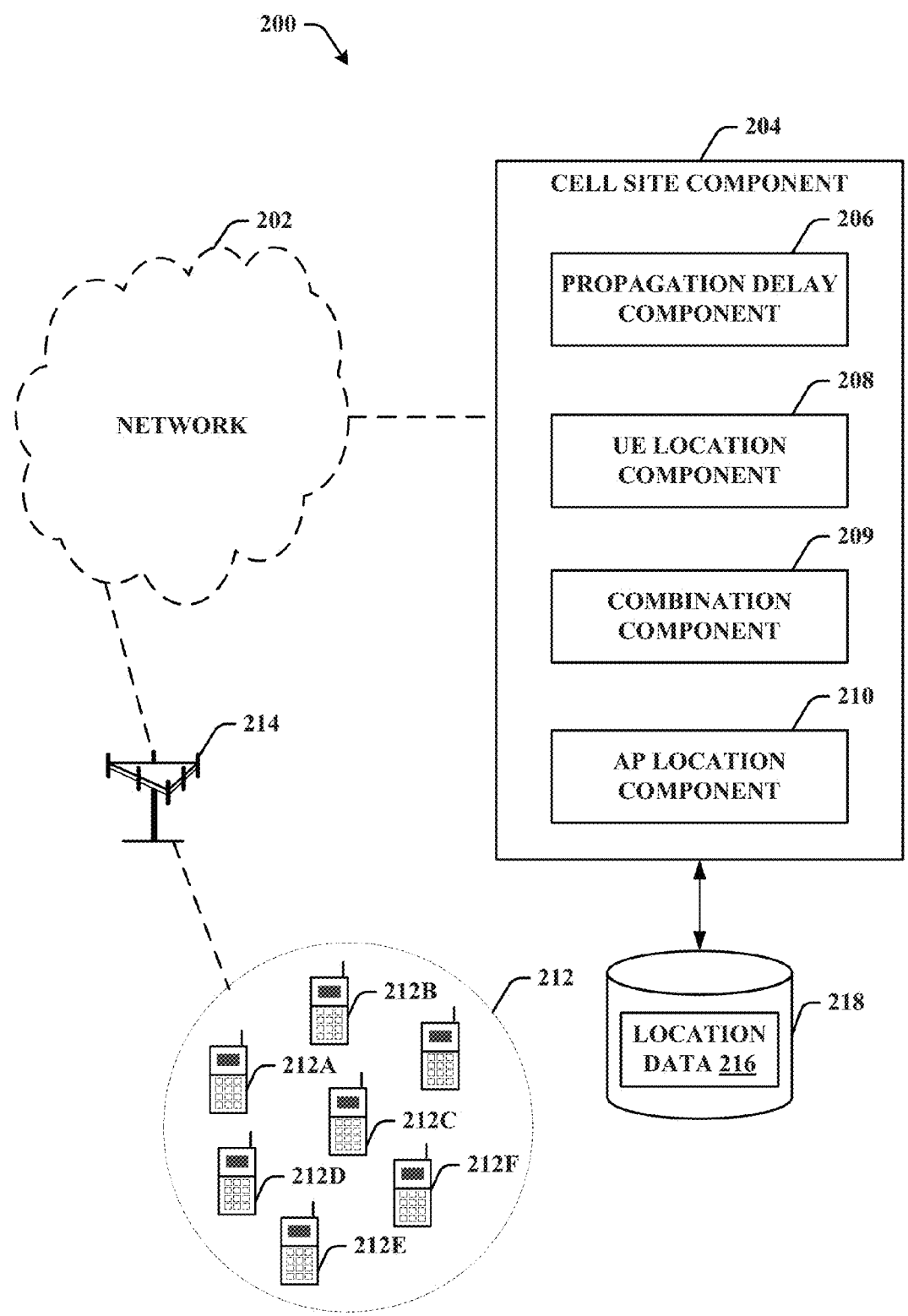
FIG. 2 illustrates an example system for site location determination using crowd sourced propagation delay and location data in accordance with various aspects described in this disclosure.

Turning now to FIG. 2, illustrated is a system 200 for site location determination using crowd sourced propagation delay and location data in accordance with various aspects described in this disclosure. The system 200 includes a network 202 (e.g., system 100) and a cell site component 204. The cell site component 204 determines a location of an access point 214 (AP 214) associated with the network 202 using crowd sourced propagation delay and location data. The cell site component 204 includes a propagation delay component 206, a user equipment (UE) location component 208, a combination component 209, and an access point (AP) location component 210.

The propagation delay component 206 obtains, acquires, or otherwise receives a set of measurements of propagation delay between a mobile device (UE) and an AP (propagation delay measurements). For example, the network 202 can determine propagation delay measurements for a UE 212A and an AP 214 during radio link establishment, and the propagation delay component 206 can receive the propagation delay measurement, e.g., via the network 202. The propagation delay measurements include measurements of lengths of time required for a signal to travel from a sender (e.g., UE) to a receiver (e.g., AP), and can be employed to determine a distance (e.g., maximum distance or minimum distance) between the sender and the receiver (discussed in greater detail with reference to FIG. 5). For example, the propagation delay measurements can include a minimum propagation delay and a maximum propagation delay.

The UE location component 208 acquires, determines, or otherwise receives a location of a UE (UE location). For example, a set of location based services (LBS) can be employed to determine a UE location for a UE 212A. The set of LBS can include but are not limited to global positioning systems (GPS), and/or assisted global positing systems (AGPS). For instance, the network 202 can request the UE 212A to employ an AGPS associated with the UE 212A to determine a location of the UE 212A. In response to the request, the UE 212A provides a set of AGPS measurements, and the UE location component 208 receives the set of AGPS measurements, e.g., via the network 202. The AGPS measurements can provide a fixed reference point (e.g., latitude and longitude) that can be used to facilitate a determination of a location of an access point (AP).

The combination component 209 combines, joins, or otherwise includes the propagation delay measurements and the UE location in a set of location data. In addition, the combination component 209 appends, attaches, or otherwise associates a time stamp and/or UE identifier to the set of location data. For example, propagation delay measurements and a UE location received at a first time (e.g., 6:00 AM on Apr. 4. 2013) and associated with a first UE can be included in a first set of location data, and a time stamp corresponding to the first time and/or an identifier of the first UE can be associated with the first set of location data. It can be appreciated that although the sets of location data 216 are illustrated as being maintained in a data store 218, such implementation is not so limited. For example, the sets of location data 216 can be maintained in a different location, and the cell site component 204 can access the sets of location data 216, for example, via a network connection.

The AP location component 210 calculates, identifies, or otherwise determines a location of an AP based in part on sets of location data 216 corresponding to the AP. For example, in one implementation, the AP location component 210 determines a location of an AP by determining overlapping or intersecting locations included in respective sets of location data 216 associated with the AP. For instance, if a first set of location data and a second set of location data include an overlapping (intersecting) location, then the AP location component 210 can determine that the overlapping location is an estimated location of the AP. It can be appreciated that the more sets of location data corresponding to an AP that include an overlapping location, the greater the probability that the overlapping location includes the AP.

In addition, it can be appreciated that although the cell site component 204 is illustrated as being a stand-alone component, such implementation is not so limited. For example, the cell site component 204 can be included in the network 202. As an additional or alternative example, the cell site component 204 can be included a probe network. For instance, if the network 202 is a third generation partnership project (3GPP) network, then the cell site component 204 can be included in a probe network that captures or receives control plane level data, including encoded 3GPP messages, radio access network application part (RANAP) messages, and/or node B application part (NBAP) messages including propagation delay measurements and/or UE locations, and decodes the messages (e.g., 3GPP, RANAP, NBAP).

Figure 3:
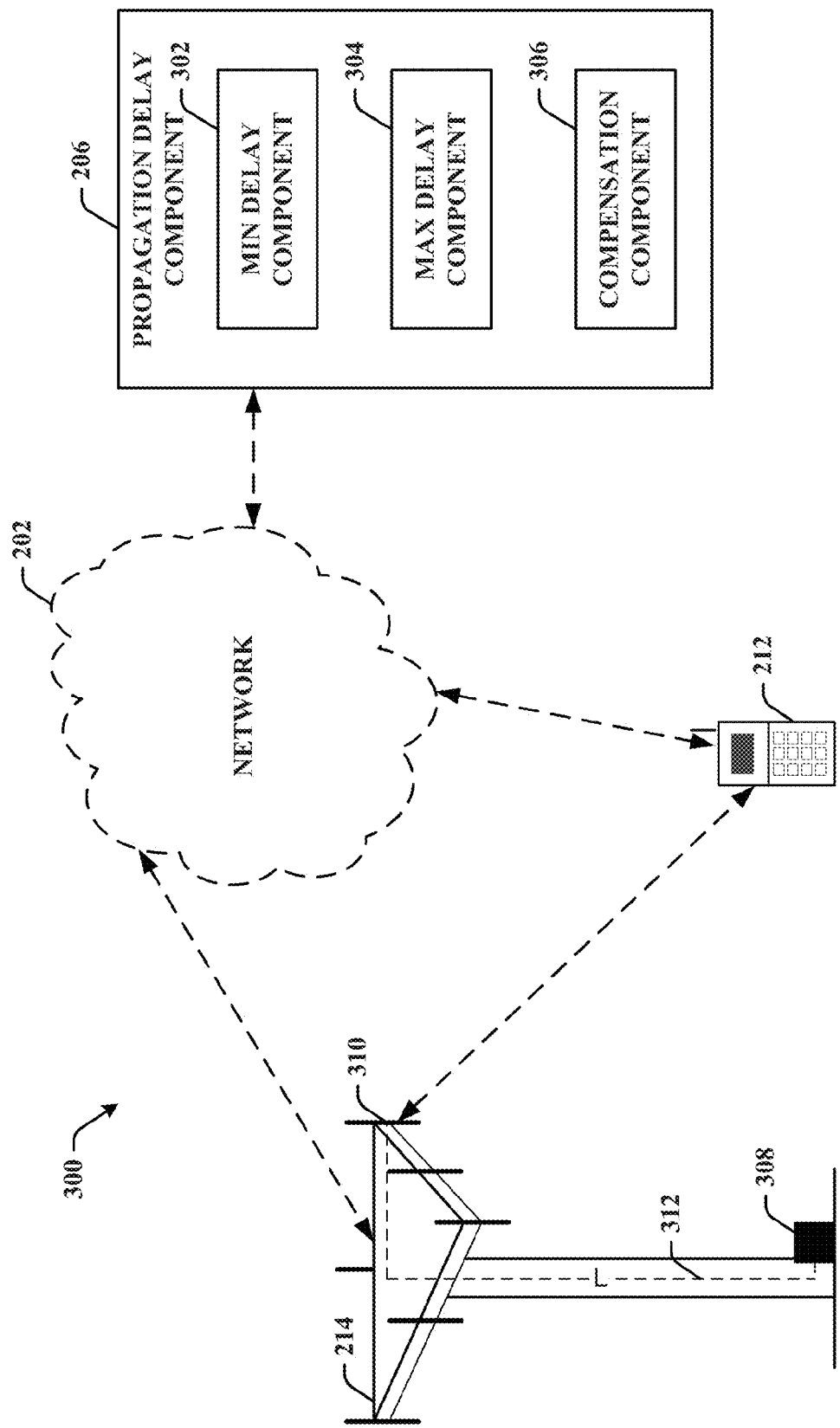
FIG. 3 illustrates an example propagation delay component in accordance with various aspects described in this disclosure.

FIG. 3 illustrates an example propagation delay component 206 in accordance with various aspects described in this disclosure. As discussed, the propagation delay component 206 receives a set of measurements of propagation delay between a mobile device 212 (UE 212) and an AP 214 (propagation delay measurements). For example, the network 202 can determine propagation delay measurements for the UE 212 and the AP 214 during radio link establishment, and the propagation delay component 206 can receive the propagation delay measurements, e.g., via the network 202. The propagation delay component 206 in FIG. 3 includes a minimum delay component 302 (min delay component 302), a maximum delay component 304 (max delay component 304), and a compensation component 306.

The min delay component 302 determines or receives a minimum propagation delay between the UE 212 and the AP 214. For example, the minimum propagation delay measurement can be included in an encoded message, and the min delay component 302 can decode the message and extract the minimum propagation delay measurement. As an additional or alternative example, the min delay component 302 can determine a minimum propagation delay measurement included in a message based on a set of minimum propagation delay criteria. The minimum propagation delay criteria can include but are not limited to having a value that is less than other propagation delay measurements included in a message.

The max delay component 304 determines or receives a maximum propagation delay between the UE 212 and the AP 214. For example, the maximum propagation delay measurement can be included in an encoded message, and the max delay component 304 can decode the message and extract the maximum propagation delay measurement. As an additional or alternative example, the max delay component 304 can determine a maximum propagation delay measurement included in a message based on a set of maximum propagation delay criteria. The maximum propagation delay criteria can include but are not limited to having a value that is greater than other propagation delay measurements included in a message.

The propagation delay measurements include measurements of lengths of time required for signals to travel from a sender (e.g., UE 212) to a receiver (e.g., AP 214), and can be employed to determine a distance (e.g., maximum distance or minimum distance) between the sender and the receiver, when the speed of the signal is known. For example, the network 202 can measure the propagation delay based on a predetermined propagation delay measurement unit (e.g., chips), and each unit can correspond to a predetermined distance (e.g., 78 meters). For instance, if the minimum propagation delay between the UE 212 and the AP 214 is six chips, then the minimum distance between the UE 212 and AP 214 is 234 meters (e.g., 6 chips×78 meters).

The compensation component 306 determines if the propagation delay measurements include a compensation factor. For example, a propagation delay measurement may be determined using base equipment 308 communicatively coupled to an antenna 310 by a connection 312 (e.g., wire, cable, etc.) having a length, L, where L can be a positive real number. If the length of the connection 312, L, from the antenna 310 to the base equipment 308 (e.g., height of the AP tower) is 100 meters, and a propagation delay measurement is determined based on a length of 234 meters without accounting for L, then the determined propagation delay measurement may be incorrect. The compensation component 306 can determine a set of vendor information (e.g., vendor identifier, part number, etc.) for AP 214, the antenna 310, and/or base equipment 308 and, based on the vendor information, determine if the propagation delay measurements include a compensation factor. If the propagation delay measurements do not include a compensation factor, then the compensation component 306 alters, modifies, or otherwise corrects the propagation delay measurements based on L.

Figure 4:
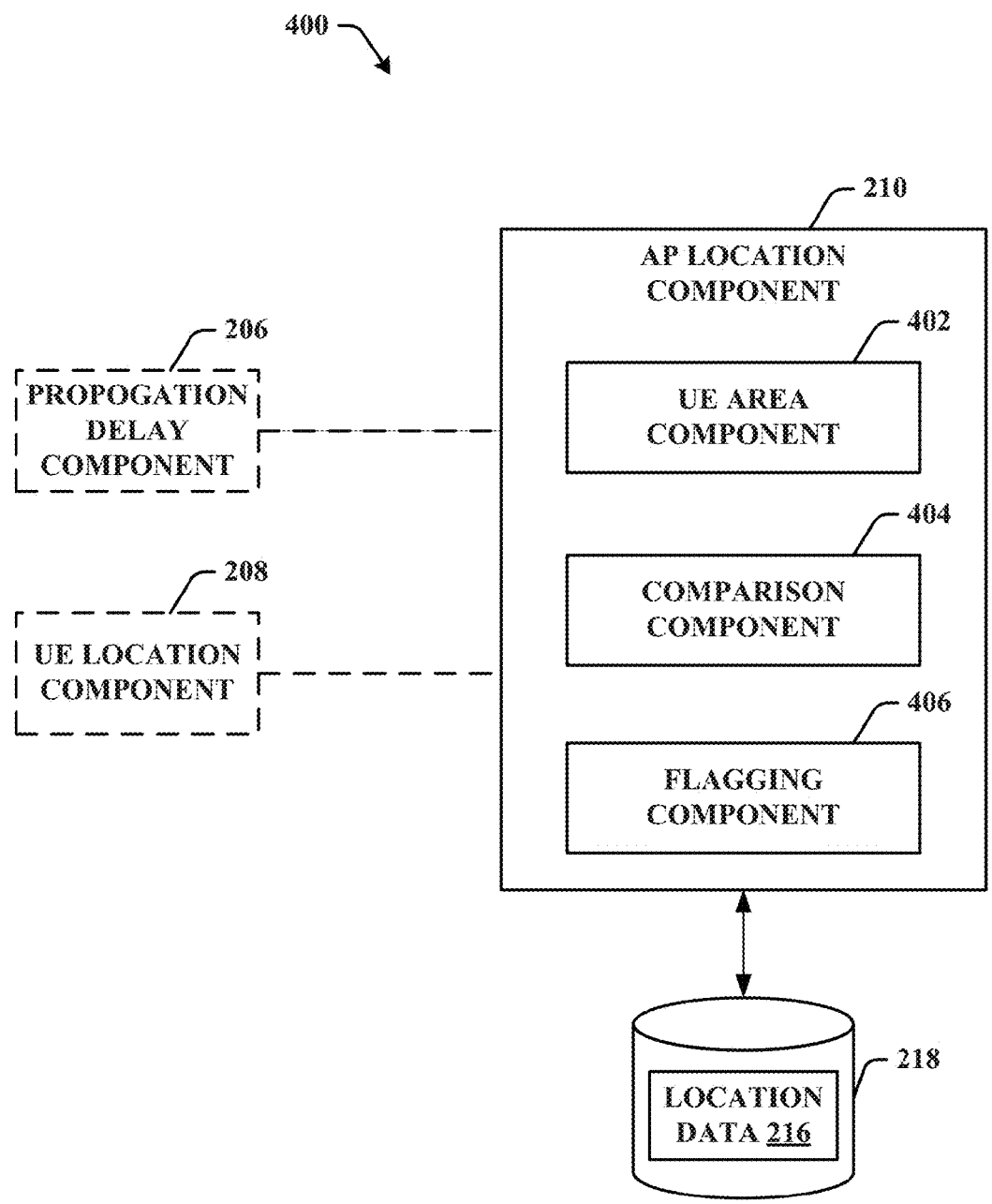
FIG. 4 illustrates an example access point location component in accordance with various aspects described in this disclosure.

Referring to FIG. 4, illustrated is an example access point location component 210 in accordance with various aspects described in this disclosure. As discussed, the access point (AP) location component 210 determines a location of the AP based on sets of location data 216 associated with the AP. The AP location component 210 in FIG. 4 includes a UE area component 402, a comparison component 404, and a flagging component 406. The UE area component 402 generates, calculates, or otherwise determines UE location areas based on respective sets of location data included in the sets of location data 216 (e.g., propagation delay measurements and UE locations). For example, the UE area component 402 can generate a circle based on a first set of location data. The circle can have a minimum radius corresponding to a minimum propagation delay measurement, a maximum radius corresponding to a maximum propagation delay measurement, and a center at a location corresponding to a UE location.

The comparison component 404 determines estimated locations of an AP (estimated AP locations) based on intersecting locations of UE location areas (e.g., circles) corresponding to respective sets of location data. For instance, estimated AP locations can be determined at a set of locations where a first circle and a second circle intersect. The estimated AP locations may have some error based at least in part on the difference between the minimum radius and maximum radius of the first circle and second circle, and/or multiple intersecting locations of the first circle and second circle. The comparison component 404 can compare the intersecting locations with a set of additional information to reduce the error. The set of additional information can include but is not limited to a recorded location of an AP, and/or a set of geographical/topographical data. For instance, if a previously recorded location of an AP corresponds to a first estimated AP location, then the comparison component 404 can bias (e.g., weight, rank, flag, etc.) the first estimated AP location as likely corresponding to an actual AP location. As an additional or alternative example, if a set of geographical data indicates that a second estimated AP location is in an undesirable location (e.g., a lake), then the comparison component 404 can bias (e.g., weight, rank, flag, etc.) the second estimated AP location as not likely corresponding to an actual AP location.

The comparison component 404 determines whether an estimated AP location satisfies an error threshold. For example, the error threshold can include a size (e.g., meters, square meters, etc.) of the estimated AP location. For instance, the error threshold can be Y square meters, where Y is a real number. If the estimated AP location satisfies the error threshold, then the comparison component 404 flags, sets, or otherwise determines the estimated AP location as an actual AP location. The cell site component 204 can provide the actual AP location to a network (e.g., network 202) for a set of network services. The set of network services can include but are not limited to network locating, network optimizing, and/or network modeling. If none of the estimated AP locations satisfy the error threshold, then the comparison component 404 can instruct the cell site component 204 to increase the sample size (e.g., sets of location data 216).

If the comparison component 404 determines an actual AP location for an AP, then the cell site component 204 can stop, suspend, or otherwise reduce acquisition of location data for the AP. The flagging component 406 randomly and/or at predetermined intervals obtains, acquires, or otherwise receives additional sets of location data, and compares the additional sets of location data to the determined actual AP location. Based on the comparison, the flagging component 406 determines if respective sets of location data in the additional sets of location data satisfy an accuracy threshold. For example, the accuracy threshold can include a predetermined distance from the determined actual AP location. For instance, if an additional set of location data indicates a location of the AP as being 600 meters away from the determined actual AP location, then the additional set of location data may not satisfy the accuracy threshold. If a quantity of sets of location data in the additional sets of location data not satisfying the accuracy threshold satisfies a flagging threshold, then the flagging component 406 can flag the determined actual AP location as being potentially inaccurate, and/or set the determined actual AP location as an estimated AP location. The flagging threshold can include, for example, a predetermined quantity of sets of location data not satisfying the accuracy threshold, and/or a predetermined quantity of sets of location data not satisfying the accuracy threshold determined within a predetermined period of time. For instance, a location of an AP may have been moved during an upgrade of the network, and the flagging component 406 can flag a previously determined actual AP location for the AP as being potentially inaccurate.

Figure 5:
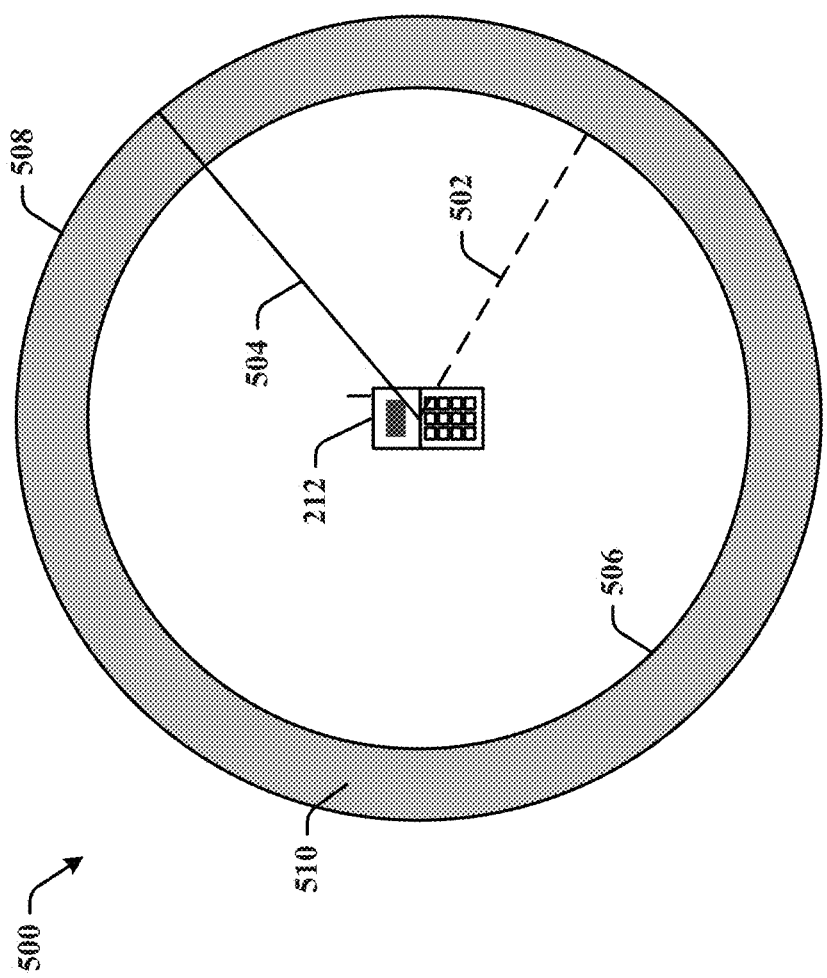
FIG. 5 illustrates a non-limiting example of a user equipment location in accordance with various aspects described in this disclosure.

FIG. 5 illustrates a non-limiting example of a system 500 for a user equipment location in accordance with various aspects described in this described in this disclosure. The system 500 includes a mobile device 212 (UE 212). As discussed, propagation delay measurements for communications between the UE 212 and an access point (AP) can be received (e.g., using the propagation delay component 206). For example, a network can determine propagation delay measurements for the UE 212 during radio link establishment. The propagation delay measurements can include a minimum propagation delay measurement 502, and a maximum propagation delay measurement 504. The propagation delay measurements are measurements of lengths of time required for a signal to travel from a sender (e.g., AP) to a receiver (e.g., UE), and a distance (e.g., maximum distance or minimum distance) between the sender and the receiver can be determined based on the propagation delay measurements. For instance, if the signal travels at a speed of X meters/second, and the propagation delay measurement is Y seconds, then it can be determined that the sender and receiver are X*Y meters apart, where X and Y are positive real numbers.

In addition, a location of the UE 212 (UE location) can be received (e.g., using the UE location component 208). For example, a set of location based services (LBS) included in a network can be used to determine the UE location for the UE 212. The set of LBS can include but are not limited to global positioning systems (GPS), and/or assisted global positing systems (AGPS). The GPS and/or AGPS measurement can provide a fixed reference point (e.g., latitude and longitude) to determine the location of the AP. A circle 510 having a minimum radius 506 corresponding to a minimum propagation delay measurement 502, a maximum radius 508 corresponding to a maximum propagation delay measurement 504, and a center at a location corresponding to the UE location for the UE 212 can be generated (e.g., using the AP location component 210). The AP can be potentially located between the minimum radius 506 and maximum radius 508 of the circle 510 (e.g., estimated AP location).

Figure 6:
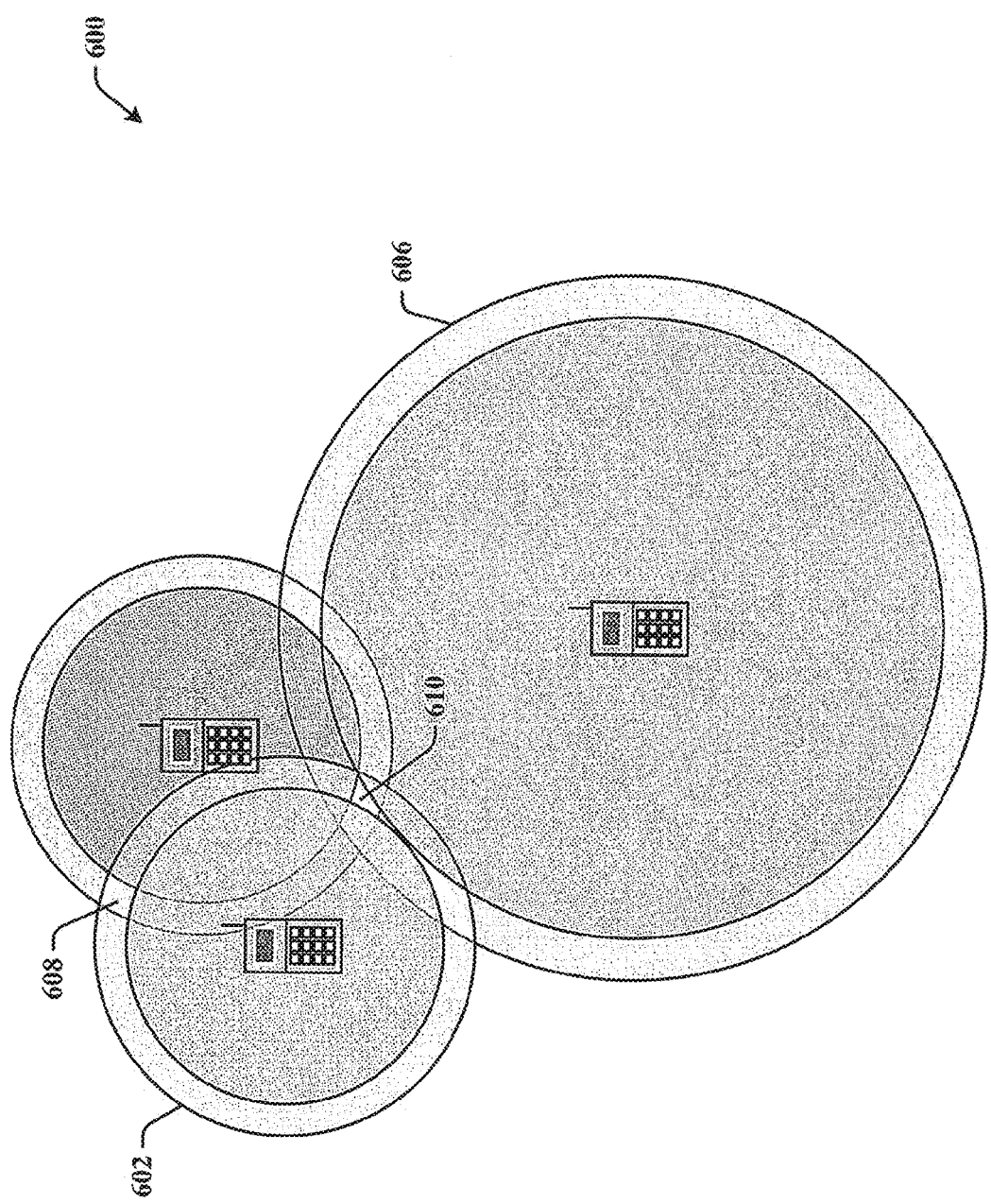
FIG. 6 illustrates a non-limiting example of a system for locating an access point in accordance with various aspects described in this disclosure.

FIG. 6 illustrates a non-limiting example of a system 600 for locating an access point in accordance with various aspects described in this disclosure. The system 600 includes a circle corresponding to a first set of location data 602 (circle 602), a circle corresponding to a second set of location data 604 (circle 604), and a circle corresponding to a third set of location data 606 (circle 606). The circles 602-606 are associated with a first access point (AP). An estimated location of the first AP (estimated AP location) can be determined based on overlapping locations or intersecting locations of the circles 602-606. As discussed, the estimated AP location may have some error based at least in part on the difference between the minimum radius and maximum radius of circles 602-606, and/or multiple intersecting locations of the circles 602-606. For example, the first circle 602 and second circle 604 intersect at a first location 608 and a second location 610. In addition, the size of the intersecting locations (e.g., error) can be based in part on the minimum radius and maximum radius of the circles 602 and 604. The intersecting locations can be compared against a set of additional information to reduce the error. The set of additional information can include but is not limited to a recorded location of an AP, and/or geographical/topographical data. For instance, if the recorded location of the AP corresponds to the second location 610, then the second location 610 can be biased (e.g., weighted, ranked, etc.) as more likely corresponding to the actual AP location than the first location 608.

A greater quantity of circles (e.g., sets of location data) can enable greater accuracy in determining an estimated AP location. For example, the third circle 606 intersects the first circle 602 and second circle 604 at the second location 610, and does not intersect the first circle 602 and second circle 604 at the first location 608. In addition, a size or area of the intersection (e.g., overlap) of the third circle 606 with the first circle 602 and second circle 604 at the second location 610 is less than a size or area of the intersection of the first circle 602 and second circle 604 at the second location 610. If the estimated AP location satisfies a predetermined error threshold, then the estimated AP location can be determined as an actual location of the AP (AP) (e.g., using the comparison component 404), and made available for network locating, optimizing, and/or modeling. If the estimated AP location does not satisfy the predetermined error threshold, then the sample size can be increased. For example, additional sets of location data can be received or determined and compared against the circles 602-606.

Figure 7:
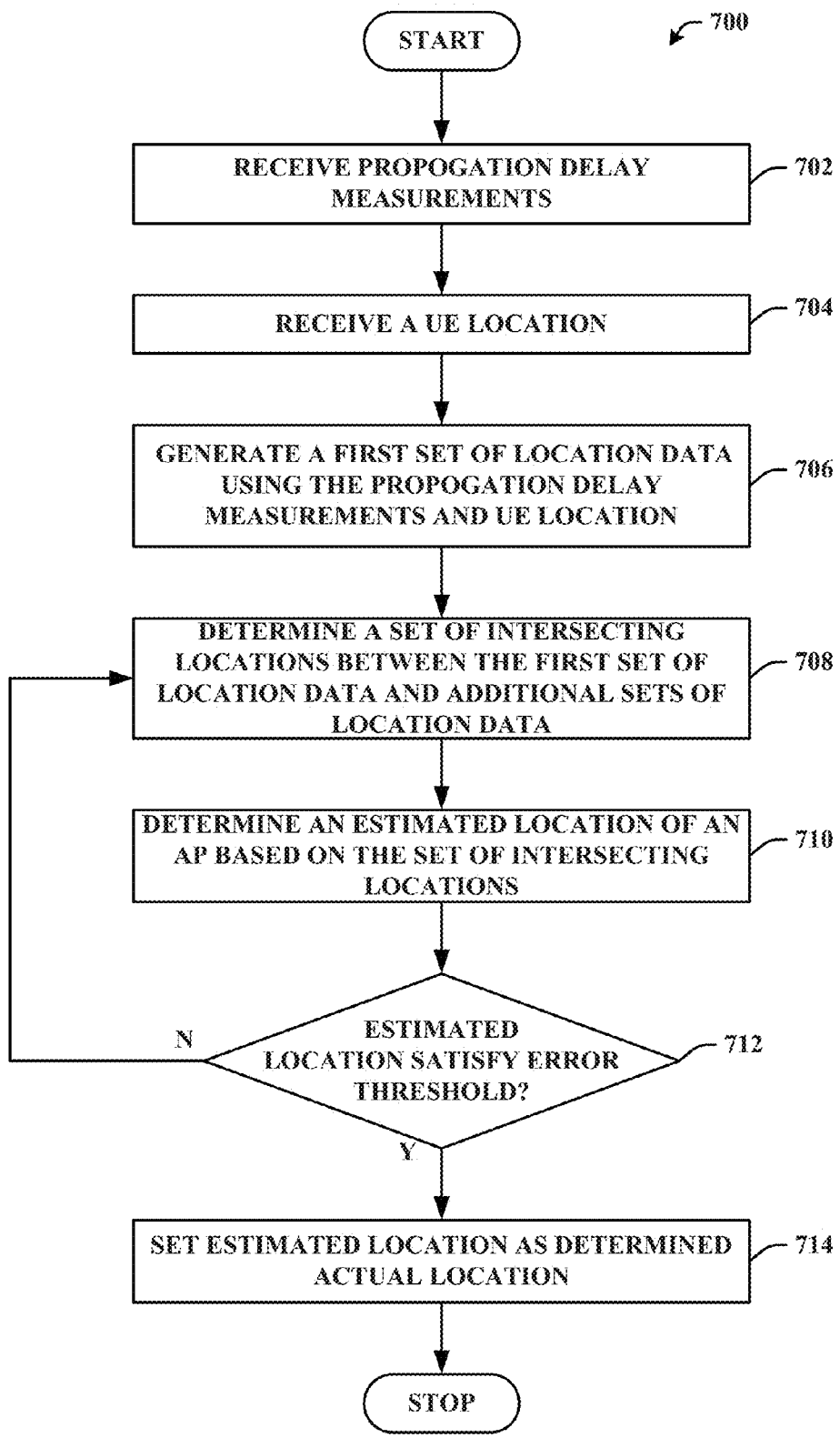
FIGS. 7-9 are flow diagrams of respective methods for site location determination using crowd sourced propagation delay and location data in accordance with various aspects described in this disclosure.
Figure 8:
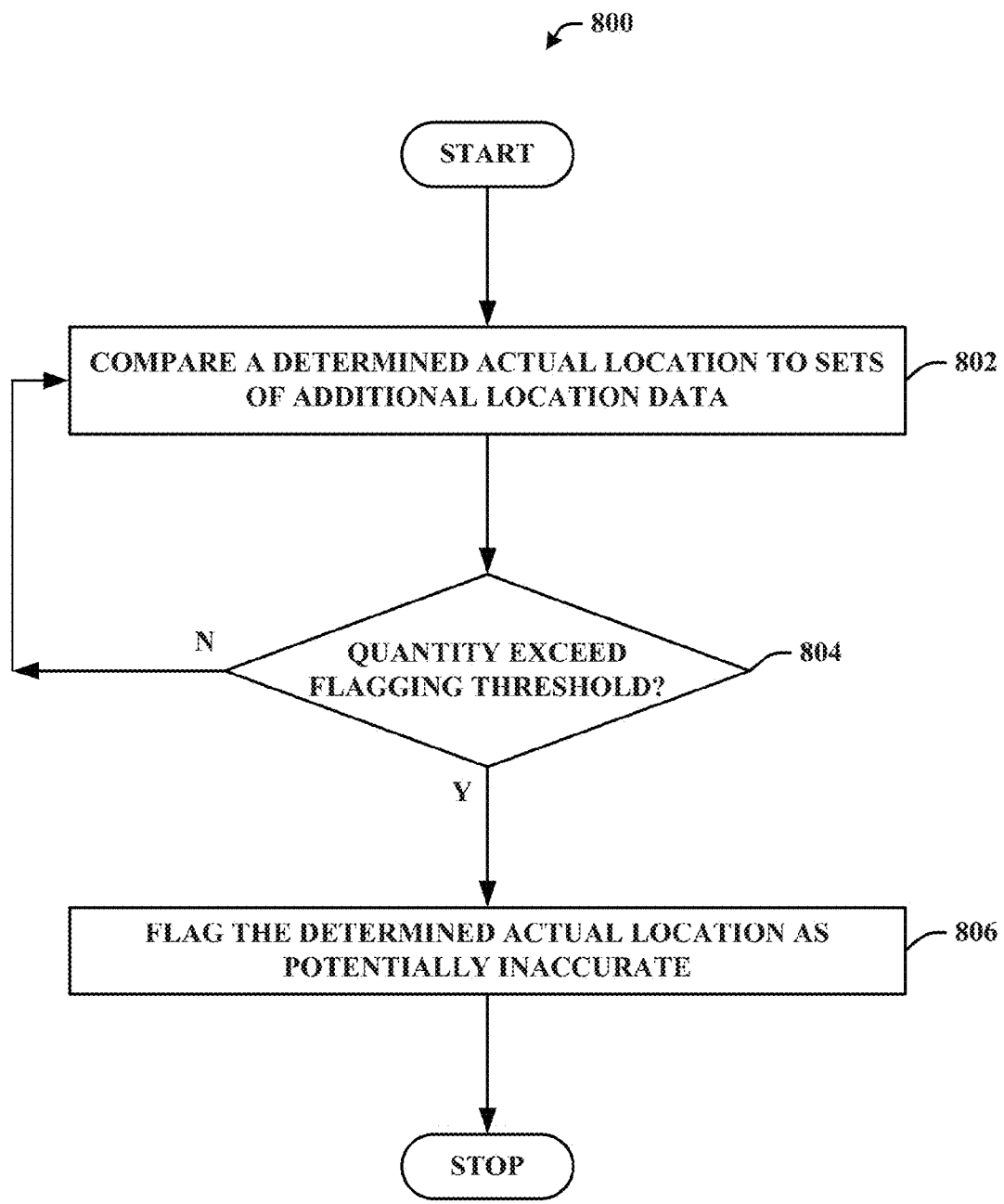
Figure 9:
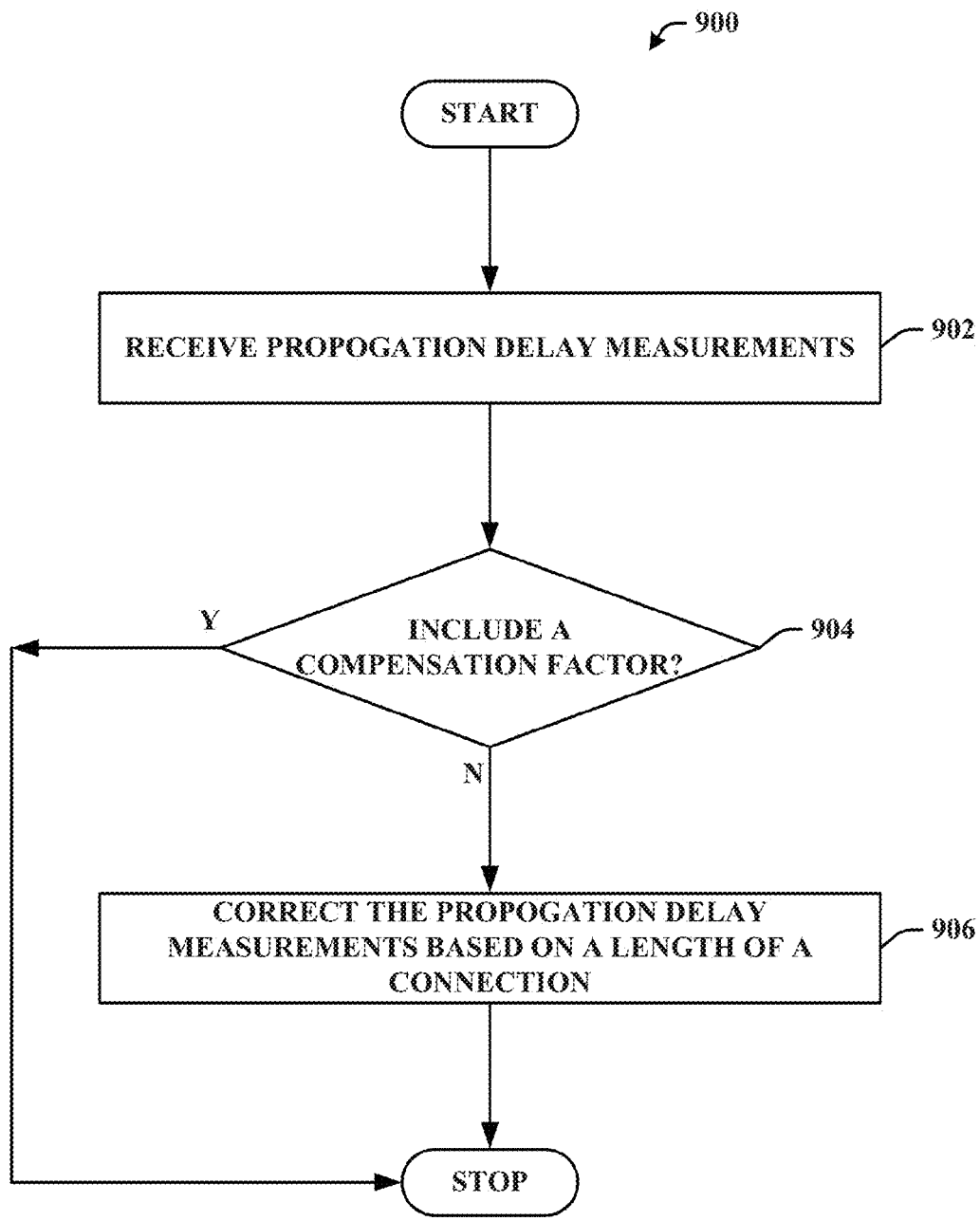

In view of the example systems described supra, methods that may be implemented in accordance with the disclosed subject matter may be better appreciated with reference to the flow charts of FIGS. 7-9. While for purposes of simplicity of explanation, the methods are shown and described as a series of blocks, it can be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 7, is an example methodology 700 for site location determination using crowd sourced propagation delay and location data in accordance with various aspects described in this disclosure. At 702, a set of propagation delay measurements between a UE and an AP can be received (e.g., using the propagation delay component 206). For example, a network can determine propagation delay measurements for a UE and an AP during radio link establishment. The propagation delay measurements include measurements of lengths of time required for a signal to travel from a sender (e.g., UE) to a receiver (e.g., AP), and can be employed to determine a distance (e.g., maximum distance or minimum distance) between the sender and the receiver (discussed in greater detail with reference to FIG. 5). For example, the propagation delay measurements can include a minimum propagation delay, and/or a maximum propagation delay.

At 704, a location of a UE (UE location) can be received (e.g., using the UE location component 208). For example, a set of network location based services (LBS) can be employed to determine a UE location. The set of LBS can include but are not limited to global positioning systems (GPS), and/or assisted global positing systems (AGPS). The GPS and/or AGPS measurements provide a fixed reference point (e.g., a latitude and a longitude) to determine the location of an access point (AP).

At 706, a first set of location data can be generated using the set of propagation delay measurements and the UE location (e.g., using the combination component 209). For example, the set of propagation delay measurements and the UE location can be included in a set of location data, and a time stamp and/or UE identifier can be associated with the set of location data. For instance, if the propagation delay measurements and the UE locations were received at a first time (e.g., 6:00 AM on Apr. 4. 2013) and are associated with a first UE, then the propagation delay measurements and the UE locations can be included in the first set of location data, and a time stamp corresponding to the first time and/or an identifier of the first UE can be associated with the first set of location data.

At 708, a set of intersecting locations between the first set location data and additional sets of location data are determined (e.g., using the comparison component 404). For example, circles corresponding to the first set of location data and the additional sets of location data can be compared, and a set of intersecting locations (e.g., overlaps) between the circles can be determined based on the comparison. The circles can have a minimum radius corresponding to a minimum propagation delay measurement, a maximum radius corresponding to a maximum propagation delay measurement, and a center location corresponding to a UE location.

At 710, an estimated location of an AP can be determined based on the set of intersecting locations (e.g., using the comparison 404). For example, an intersection included in the set of intersecting locations that has a greatest quantity of overlapping sets of location data can be determined as the estimated location of the AP. At 712, a determination can be made whether the estimated location of the AP satisfies an error threshold (e.g., using the comparison component 404). At 714, if it is determined that the estimated location of the AP satisfies the error threshold (Y at 712), then the estimated location can be set as a determined actual location of the AP (e.g., using the AP location component 210). The determined actual location of the AP can be made available for a set of network services, including but not limited to network locating, network optimizing, and/or network modeling. Returning to 712, if it is determined that the estimated location of the AP does not satisfy the error threshold (N at 712), then the methodology returns to 708, and intersecting locations between the first set of intersecting locations and other additional sets of location are determined. Comparing an estimated AP location against a greater quantity of sets of location data (e.g., sample size) may increase the accuracy of the estimated AP location determination.

Turning now to FIG. 8, is an example methodology 800 for site location determination using crowd sourced propagation delay and location data in accordance with various aspects described in this disclosure. At 802, a determined actual location can be compared against sets of additional location data (e.g., using the flagging component 406). For example, the determined actual location can be compared against sets of additional location data randomly and/or at predetermined intervals, (e.g., monthly, quarterly, etc.).

At 804, a determination can be made whether a quantity of location data not satisfying an accuracy threshold satisfies a flagging threshold (e.g., using the flagging component 406). For example, if a set of location data included the additional sets of location data indicates an estimated location of the AP as being 600 meters away from the determined actual AP location, then the location data may not satisfy the accuracy threshold.

At 806, if it is determined that the quantity of location data not satisfying the accuracy threshold satisfies the flagging threshold (Y at 804), then the determined actual location of the AP can be flagged as being potentially inaccurate (e.g., using the flagging component 406). For instance, a location of an AP may have been moved during an upgrade of a network, and a previously determined actual location for the AP can be flagged as being potentially inaccurate. Returning to 804, if it is determined that the quantity of location data not satisfying the accuracy threshold does not satisfy the flagging threshold (N at 804), then the methodology returns to 802.

FIG. 9 is an example methodology 900 for site location determination using crowd sourced propagation delay and location data in accordance with various aspects described in this disclosure. At 902, a set of propagation delay measurements for communications between a UE and an AP are received (e.g., using the propagation delay component 206). For example, a network can determine propagation delay measurements for a UE and an AP during radio link establishment. The propagation delay measurements include measurements of lengths of time required for a signal to travel from a sender (e.g., UE) to a receiver (e.g., AP), and can be employed to determine a distance (e.g., maximum distance or minimum distance) between the sender and the receiver (discussed in greater detail with reference to FIG. 5). For example, the propagation delay measurements can include a minimum propagation delay, and a maximum propagation delay.

At 904, a determination can be made whether the set of propagation delay measurements include a compensation factor (e.g., using the compensation component 306). For example, a propagation delay measurement may be determined using base equipment communicatively coupled to an antenna of an AP by a connection (e.g., wire, cable, etc.) having a length, L, where L is a positive real number. If the length of the connection, L, from the antenna to the base equipment (e.g., height of the AP tower) is 100 meters, and the propagation delay measurement is determined based on a distance of 234 meters (e.g., from the UE to the base equipment) without accounting for L, then the determined propagation delay measurement may be incorrect. In one implementation, a set of vendor information (e.g., vendor identifier, part number, etc.) for an AP, the antenna, and/or base equipment, can be determined and, based on the vendor information, a determination can be made whether the set of propagation delay measurements include a compensation factor.

At 906, if it is determined that the set of propagation delay measurements do not include a compensation factor (N at 904), then the set of propagation delay measurements are corrected based on L (e.g., using the compensation component 306). Returning to 904, if it is determined that the set of propagation delay measurements include a compensation factor (Y at 904), then the methodology terminates.

Figure 10:
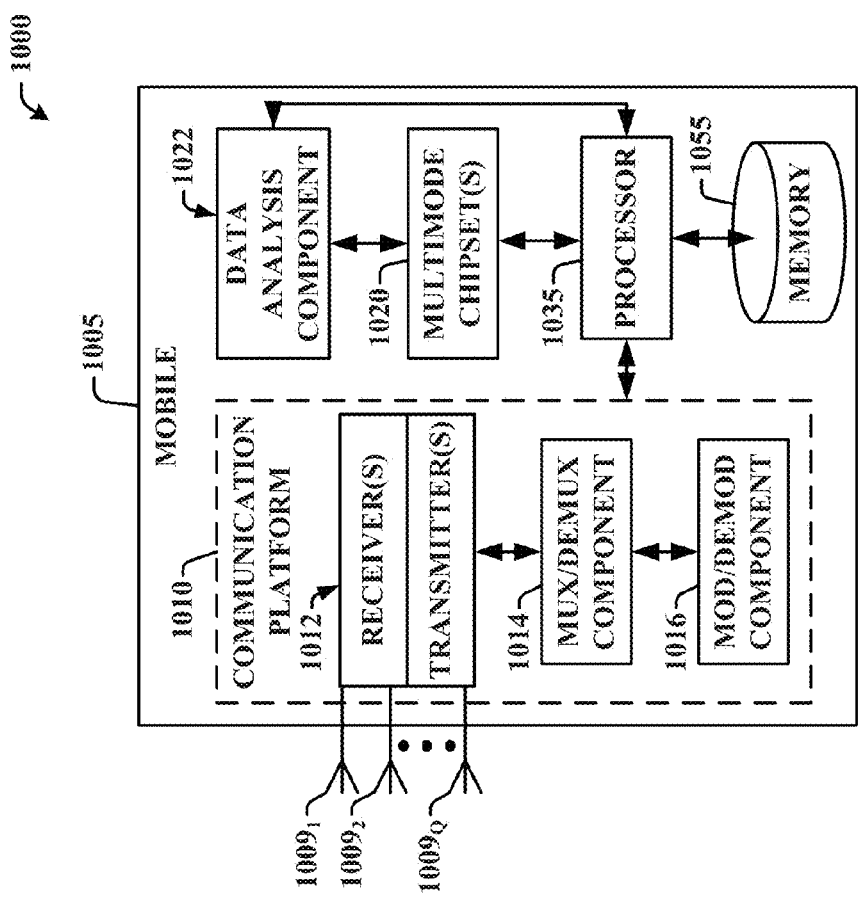
FIGS. 10-11 illustrate example systems that can be employed with various aspects described in this disclosure.
Figure 11:
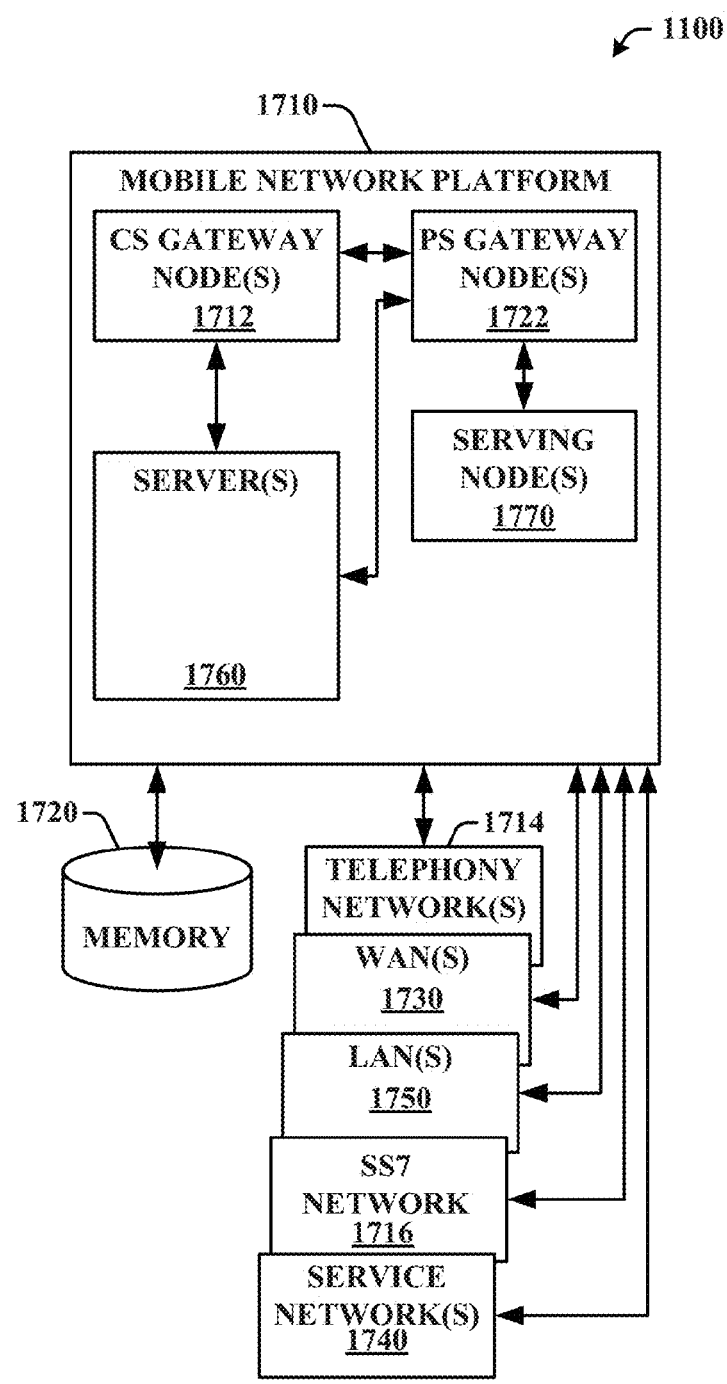

To provide further context for various aspects described herein, FIG. 10 illustrates a non-limiting example block diagram of a system 1000 of a mobile 1005 that can deliver content(s) or signaling directed to a device in accordance with aspects described herein. Additionally, FIG. 11 illustrates a non-limiting example block diagram of a system 1100 of a mobile network platform 1110 which can provide subscriber data in accordance with aspects described herein.

In the mobile 1005 of FIG. 10, which can be a multimode access terminal, a set of antennas $1009_1$-$1009_Q$ (Q is a positive integer) can receive and transmit signal(s) from and to wireless devices like access points, access terminals, wireless ports and routers, and so forth that operate in a radio access network. It should be appreciated that antennas $1009_1$-$1009_Q$ are a part of communication platform 1010, which comprises electronic components and associated circuitry that provide for processing and manipulation of received signal(s) and signal(s) to be transmitted; e.g., receivers and transmitters 1012, mux/demux component 1014, and mod/demod component 1016.

In the system 1000, multimode operation chipset(s) 1020 allows mobile 1005 to operate in multiple communication modes in accordance with disparate technical specification for wireless technologies. In an aspect, multimode operation chipset(s) 1020 utilizes communication platform 1010 in accordance with a specific mode of operation (e.g., voice, Global Positioning System (GPS)). In another aspect, multimode operation chipset(s) 1020 can be scheduled to operate concurrently (e.g., when Q>1) in various modes or within a multitask paradigm.

Mobile 1005 includes data analysis component 1022 and can convey content(s) or signaling in accordance with aspects described herein. It should be appreciated that data analysis component 1022, can include a display interface that renders content in accordance with aspects of an user prompt component (not shown) that resides within data analysis component 1022.

Mobile 1005 also includes a processor 1035 configured to confer functionality, at least in part, to substantially any electronic component within mobile 1005, in accordance with aspects described herein. As an example, processor 1035 can be configured to execute, at least in part, instructions in multimode operation chipset(s) that afford multimode communication through mobile 1005 such as concurrent or multitask operations of two or more chipset(s). As another example, processor 1035 can facilitate mobile 1005 to receive and convey signaling and content(s) (e.g., various data flows) that are part of an active management act initiated by a subscriber that operates mobile 1005, or an approval cycle associated with auxiliary subscribers (e.g., secondary subscriber, tertiary subscriber . . . ). Moreover, processor 1035 facilitates mobile 1005 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 1055 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In the system 1000, processor 1035 is functionally coupled (e.g., through a memory bus) to memory 1055 in order to store and retrieve information necessary to operate and/or confer functionality, at least in part, to communication platform 1010, multimode operation chipset(s) 1020, data analysis component 1022, and substantially any other operational aspects of multimode mobile 1005.

FIG. 11 illustrates a block diagram 1100 of a mobile network platform 1110 which can provide data analysis in accordance with aspects described herein. Generally, mobile network platform 1110 can include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect, as described above, component within PS domain of network platform 1110 can be employed to effect communication in accordance with aspects described herein.

With respect to CS communication, mobile network platform 1110 includes CS gateway node(s) 1112 which can interface CS traffic received from legacy networks such as telephony network(s) 1114 (e.g., public switched telephone network (PSTN), or public land mobile network (PLMN)) or a SS7 network 1116. Circuit switched gateway node(s) 1112 can authorize and authenticate traffic (e.g., voice) arising from such networks. Additionally, CS gateway node(s) 1112 can access mobility, or roaming, data generated through SS7 network 1116; for instance, mobility data stored in a visitation location register (VLR), which can reside in memory 1120. Moreover, CS gateway node(s) 1112 interfaces CS-based traffic and signaling and gateway node(s) 1122. As an example, in a 3GPP UMTS network, CS gateway node(s) 1112 can be embodied, at least in part, in gateway GPRS support node(s) (GGSN).

In addition to receiving and processing CS-switched traffic (e.g., content(s) that can be part of a content(s) transmitted by a service provider) and signaling, PS gateway node(s) 1122 can authorize and authenticate PS-based data sessions with served mobile devices, non-mobile devices, and access points. Data sessions can include traffic, or content(s), exchange with networks external to the mobile network platform 1110, such as wide area network(s) (WANs) 1130 or service network(s) 1140; it should be appreciated that local area network(s) (LANs) 1150 can also be interfaced with mobile network platform 1110 through PS gateway node(s) 1122. Packet-switched gateway node(s) 1122 generates packet data contexts when a data session is established. To that end, in an aspect, PS gateway node(s) 1122 can include a tunnel interface (e.g., tunnel termination gateway (TTG) in 3GPP UMTS network(s) (not shown)) which can facilitate packetized communication with disparate wireless network(s), such as network platform and associated radio access network, Wi-Fi networks. It should be further appreciated that the packetized communication can include multiple flows that can be generated through service (e.g., provisioning) and application server(s) 1160. It is to be noted that in 3GPP UMTS network(s), PS gateway node(s) 1122 (e.g., GGSN) and tunnel interface (e.g., TTG) comprise a packet data gateway (PDG).

The mobile network platform 1110 also includes serving node(s) 1170 that convey the various packetized flows of data streams (e.g., content(s) or signaling directed to a subscribed data), received through PS gateway node(s)

1122. As an example, in a 3GPP UMTS network, serving node(s) 1170 can be embodied in serving GPRS support node(s) (SGSN).

Server(s) 1160 in mobile network platform 1110 can execute numerous applications (e.g., location services, online gaming, wireless banking, wireless device management . . . ) that can generate multiple disparate packetized data streams or flows, and manage (e.g., schedule, queue, format . . . ) such flows. Such application(s), for example can include add-on features to standard services provided by mobile network platform 1110. Data streams (e.g., content(s) or signaling directed to a file) can be conveyed to PS gateway node(s) 1122 for authorization/authentication and initiation of a data session, and to serving node(s) 1170 for communication thereafter.

Server(s) 1160 can also effect security (e.g., implement one or more firewalls) of mobile network platform 1110 to ensure network's operation and data integrity in addition to authorization and authentication procedures that CS gateway node(s) 1112 and PS gateway node(s) 1122 can enact. Moreover, server(s) 1160 can provision services from external network(s), e.g., WAN 1130, or Global Positioning System (GPS) network(s) (not shown). It is to be noted that server(s) 1160 can include one or more processors configured to confer at least in part the functionality of macro network platform 1110. To that end, the one or more processor can execute code instructions stored in memory 1120, for example.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, et cetera), optical disks (e.g., compact disk (CD), digital versatile disk (DVD), et cetera), smart cards, and flash memory devices (e.g., card, stick, key drive, et cetera). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

As used herein, the term "identifying information" is intended to be contact information known at the time a communication is connected relating to a party of the communication and can include (but is not limited to) telephone numbers, aliases, messenger names and identifiers, e-mail addresses, extensions, device personal identification numbers (PINs), distribution lists, network addresses, component addresses (e.g., medium access control (MAC) addresses, machine addresses, et cetera) or other component identifiers, user names, nicknames, domains, signatures (electronic, physical, and otherwise), references, forwarding configurations, and network addresses. The term "communication" as used when two or more devices correspond is intended to expansively capture all means of transmission or reception available to state-of-the-art devices and can include (but is not limited to) cellular, satellite transmission, VOIP and SIP voice connections, short message service (SMS) exchanges, broadcast data, network sessions, e-mails, instant messages, other network-based messaging, PIN or other device-based messaging, voicemail, picture mail, video mail, mixed-content correspondence, Unified Messaging (UM), and other digital and analog information transmitted between parties in any local and/or distant, physical and/or logical region.

Similarly, the concept of "data transmission" herein is intended to broadly represent known means of information exchange with digital or analog systems, including but not limited to hard-wired and direct connections (e.g., local media, universal serial bus (USB) cable, integrated drive electronics (IDE) cable, category 5 cable, coaxial cable, fiber optic cable and telephone cable), shared connections (e.g., remote and/or distributed resources) wireless connections (e.g., Wi-Fi, Bluetooth, infrared wireless, Zigbee, other 802.XX wireless technologies, and personal area network connections), messaging systems (e.g., short message service (SMS), instant messaging, and other network-enabled other messaging), mobile or cellular transmissions and combinations thereof (e.g., personal communication system (PCS) and integrated networks), Unified Messaging, and other means of techniques of communication employed by telephones, personal digital assistants (PDAs), computers and network devices. "Mixed-content message," as used herein, is intended to represent communications employing one or more means of data transmission to present one or more varieties of device-capable content, including (but not limited to) picture messages, audio or video messages, and messages where text or other media types accompany one another. A "user device" can include, but is not limited to, data-enabled telephones (cellular telephones, smart phones, soft phones, VOIP and SIP phones, satellite phones, telephones coupled to computer systems, et cetera), communications receivers, personal digital assistants, pagers, portable e-mail devices, portable web browsers, media devices capable of receiving data, portable computers, and other electronics that allow a user to receive communications from other parties.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise historic data on previously served queries; communication party information from various sources; files and applications; and so forth. It is to be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of aspects of the claimed subject matter. It is, of course, not possible to describe every conceivable combination of components or methods for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. While various components have been illustrated as separate components, it will be appreciated that multiple components can be implemented as a single component, or a single component can be implemented as multiple components, without departing from example embodiments. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim. Embodiments and examples provided in the foregoing are non-exhaustive and understood to capture similar functionality known as of the disclosures herein.

What is claimed is:

1. A system, comprising:
a processor; and
a memory that stores executable instructions that, when executed by the processor, facilitate performance of operations, comprising:
receiving, from a network device of a wireless network, propagation delay measurements based on signals exchanged by a mobile device and an access point device;
receiving, from the network device, first location data related to a first location of the mobile device;
generating second location data based on the propagation delay measurements and the first location data;
in response to the generating the second location data, determining an estimated location of the access point device resulting in third location data related to the estimated location;
generating first flag data associated with a first flagging of the estimated location as not corresponding to an actual location of the access point device, resulting in a first flagged location;
comparing the third location data to geographical data related to a topology of the estimated location;
in response to the comparing, determining that the estimated location of the access point device is an improbable location of the access point device according to an improbability criterion, and generating second flag data associated with a second flagging of the estimated location as an undesirable location, wherein the second flag data corresponds to the first flagged location;
in response to the first flag data and the second flag data being generated, instructing a cell site device to increase a sample size associated with the estimated location;
determining that the propagation delay measurements do not comprise a compensation factor for a length of a connection between an antenna of the access point device and base station equipment for the access point device; and
in response to the propagation delay measurements being determined not to comprise the compensation factor, correcting the propagation delay measurements based on the length of the connection between the antenna of the access point device and the base station equipment for the access point device.

2. The system of claim 1, wherein the determining the estimated location of the access point device is the improbable location according to the improbability criterion is based on a result of a comparison of the first location data and the third location data.

3. The system of claim 2, wherein the determining the estimated location of the access point device is the improbable location according to the improbability criterion comprises determining intersecting locations related to mobile devices.

4. The system of claim 1, wherein the determining the estimated location of the access point device is the improbable location results in fourth location data representing the improbable location.

5. The system of claim 4, wherein the operations further comprise:
sending, to the network device, the fourth location data to facilitate modeling of network devices of the wireless network comprising the access point device.

6. The system of claim 4, wherein the network device is a first network device, and wherein the operations further comprise:
initiating sending of the fourth location data to a second network device of the wireless network for use in a network service.

7. The system of claim 1, wherein the determining the estimated location of the access point device is the improbable location according to the improbability criterion comprises determining that the estimated location satisfies an error threshold.

8. The system of claim 7, wherein the error threshold is a difference between a minimum propagation delay and a maximum propagation delay of the propagation delay measurements.

9. The system of claim 1, wherein the determining the estimated location of the access point device is the improbable location according to the improbability criterion comprises determining that the estimated location does not satisfy an error threshold.

10. The system of claim 1, wherein the determining that the propagation delay measurements do not comprise the compensation factor comprises determining a vendor data associated with a part number related to the compensation factor.

11. A method, comprising:
determining, by a system comprising a processor, propagation delay measurements by receiving signals exchanged by a mobile device and an access point device;
receiving, by the system, first location data representing a location of the mobile device;
generating, by the system, second location data based on the propagation delay measurements and the location data representing the location of the mobile device;
comparing, by the system, the second location data and first additional location data corresponding to mobile devices, wherein the comparing comprises comparing intersecting locations of the mobile devices resulting in quantity data;
based on the comparing the second location data and the first additional location data, determining, by the system, an estimated location of the access point device resulting in estimated location data;
flagging the estimated location as not corresponding to an actual location of the access point device, wherein the flagging comprises generating flag data associated with the flagging the estimated location as an undesirable location;
in response to the flagging, instructing a cell site device to increase a sample size associated with the estimated location;
comparing, by the system, the estimated location data to topographical data related to a topography of the location of the mobile device;
in response to the comparing, determining, by the system, that the estimated location is not a probable location of the access point device based on satisfaction of a probability criterion;
determining that the propagation delay measurements do not comprise a compensation factor for a length of a connection between an antenna of the access point device and base station equipment for the access point device; and
in response to the propagation delay measurements being determined not to comprise the compensation factor, correcting the propagation delay measurements based on the length of the connection between the antenna of the access point device and the base station equipment for the access point device.

12. The method of claim 11, wherein the quantity data is based on a condition related to an error threshold being determined to have been satisfied.

13. The method of claim 12, wherein the error threshold is a difference between a minimum propagation delay and a maximum propagation delay.

14. The method of claim 13, wherein the intersecting locations of the mobile devices are first intersecting locations of the mobile devices, and further comprising:
comparing, by the system at a defined time interval, the second location data and second additional location data corresponding to the mobile devices, wherein the comparing the second location data and the second additional location data comprises comparing second intersecting locations of the mobile devices.

15. The method of claim 13, further comprising:
in response to the determining that the estimated location is not the probable location, adding, by the system, flag data to the second location data, wherein the flag data indicates that the estimated location is not the probable location.

16. A non-transitory machine-readable storage medium comprising executable instructions that, when executed by a processor, facilitate performance of operations, comprising:
receiving a first location of a first mobile device and first propagation delay measurements for first signals exchanged by the first mobile device and an access point device;
generating first location data using the first propagation delay measurements and the first location of the first mobile device;
receiving a second location of a second mobile device and second propagation delay measurements for second signals exchanged by the second mobile device and the access point device;
generating second location data using the second propagation delay measurements and the second location of the second mobile device;
determining an intersecting location between the first location data and the second location data;
based on the intersecting location, identifying an estimated location of the access point device resulting in estimated location data; and
in response to comparing the estimated location data to geographical data related to a geography associated with the estimated location, flagging the estimated location as not corresponding to an actual location of the access point device, wherein the flagging comprises generating flag data associated with the flagging the estimated location as an undesirable location;
in response to the flagging, instructing a cell site device to increase a sample size associated with the estimated location;
determining that the propagation delay measurements do not comprise a compensation factor for a length of a connection between an antenna of the access point device and base station equipment for the access point device; and
in response to the propagation delay measurements being determined not to comprise the compensation factor, correcting the propagation delay measurements based on the length of the connection between the antenna of the access point device and the base station equipment for the access point device.

17. The non-transitory machine-readable storage medium of claim 16, wherein the operations further comprise:
determining that the second propagation delay measurements do not comprise the compensation factor for the cable length of the connection between the antenna of the access point device and the station equipment for the access point device, wherein the determining comprises a vendor identifier associated with the compensation factor.

18. The non-transitory machine-readable storage medium of claim 17, wherein the operations further comprise:
based on the compensation factor for the cable length, biasing the second propagation delay measurements by modifying the second propagation delay measurements by amounts determined to account for the cable length.

19. The non-transitory machine-readable storage medium of claim 16, wherein the operations further comprise:
determining that the estimated location of the access point device satisfies an error threshold, wherein the error threshold is a difference between a minimum propagation delay and a maximum propagation delay of the first signals or the second signals, and wherein the determining the estimated location of the access point device satisfies the error threshold comprises determining the estimated location satisfies a defined size of the location.

20. The non-transitory machine-readable storage medium of claim 16, wherein the operations further comprise:
    determining that the estimated location of the access point device does not satisfy an error threshold.

* * * * *